United States Patent
Haughom

(10) Patent No.: US 6,983,682 B2
(45) Date of Patent: Jan. 10, 2006

(54) METHOD AND DEVICE AT A HYDRODYNAMIC PUMP PISTON

(76) Inventor: Per Olav Haughom, Høgåsen 12, Tonstad (NO) N-4440

(*) Notice: Subject to any disclaimer, the term of this patent is extended or adjusted under 35 U.S.C. 154(b) by 0 days.

(21) Appl. No.: 10/494,139

(22) PCT Filed: Nov. 1, 2001

(86) PCT No.: PCT/NO01/00438

§ 371 (c)(1),
(2), (4) Date: Apr. 30, 2004

(87) PCT Pub. No.: WO03/038320

PCT Pub. Date: May 8, 2003

(65) Prior Publication Data

US 2004/0244577 A1 Dec. 9, 2004

(51) Int. Cl.
*F16J 15/40* (2006.01)

(52) U.S. Cl. .......................................... 92/182; 92/160

(58) Field of Classification Search .................. 92/110, 92/160, 182
See application file for complete search history.

(56) References Cited

U.S. PATENT DOCUMENTS 2,615,769 A 10/1952 Barnes et al.
4,270,440 A * 6/1981 Lewis, II ..................... 92/182
5,701,797 A * 12/1997 Mohn ........................... 92/160

FOREIGN PATENT DOCUMENTS

| EP | 0 158 457   | 10/1985 |
| EP | 0 694 139   | 1/1996  |
| FI |     65477   | 8/1980  |
| FI |    843735   | 3/1985  |
| WO | WO 86/03817 | 7/1986  |
| WO | WO 94/244468| 10/1994 |

* cited by examiner

Primary Examiner—Thomas E. Lazo
(74) Attorney, Agent, or Firm—Andrus, Sceales, Starke & Sawall, LLP

(57) ABSTRACT

A method and device for forming a sliding seal between a reciprocating piston (22) and the wall of a cylinder (8), wherein one side of the piston faces a first liquid in a pump chamber (26) of the cylinder (8), a first piston seal (24) and a second piston seal (58), spaced from the first piston seal (24), sealing between the piston and the cylinder (8); and wherein a second liquid is supplied under pressure between the seals (24, 58), the pressure of the second liquid between the seals (24, 58) being maintained at a level essentially equal to or slightly lower than the pressure of the pump chamber (26).

7 Claims, 5 Drawing Sheets

METHOD AND DEVICE AT A HYDRODYNAMIC PUMP PISTON

CROSS REFERENCE TO RELATED APPLICATION

The present application is the U.S. national stage application of International Application PCT/NO01/00438, filed Nov. 1, 2001, which international application was published on May 8, 2003 as International Publication WO 03/038320.

BACKGROUND OF THE INVENTION

This invention relates to a method and a device for use in connection with pump pistons of reciprocating pumps.

Reciprocating pumps are widely used within the industry for pumping liquid at both high and low pressures.

In principle such pumps comprise a rotating crank eccentric with a connecting rod that has a pump piston arranged there-to, said pump piston being reciprocated, thereby providing a pumping effect. On the pressure side of the piston, suction and pressure valves are arranged. The pump piston is provided with seals which form a seal between the liquid which is be ing pumped and the surroundings.

When liquids containing particularly much contamination, like e.g. sand particles, are to be pumped, the seal is subjected to great wear, resulting in repairs and cost.

Wear occurs because the seal is subjected to excessive pressure differences which make contaminants penetrate between the seal and the piston. Thereby great wearing action occurs.

SUMMARY OF THE INVENTION

As compared to known technique the object of the invention is to provide a solution which reduces wear on pump seals and pistons that are subjected to the action of contaminated liquid.

This is achieved, according to the invention, in that on its side opposite the pump pressure side the (first) piston seal of the reciprocating pump is subjected to a liquid pressure which balances the liquid pressure from the pump chamber of the pump.

The liquid pressure applied to the back-surface of the first piston seal is formed by a clean liquid which contains a lubricator and has no contamination.

By subjecting the first piston seal to approximately equal liquid pressures on both sides, the possibilities of contamination entering between the seal and the pump piston are reduced. Thereby the wear on the piston seal is reduced to a substantial degree.

The liquid pressure acting on the back surface of the first piston seal is generated in that, relative to the pump chamber, the opposite end portion of the pump piston projects into a liquid volume of a diameter approximately equal to the diameter of the pump piston. The pressure from this chamber is directed into an annular space between the pump piston and the cylinder of the reciprocating pump, defined by the first piston seal and a second piston seal, the second piston seal sealing against leakage to the surroundings.

EP patent 694139 B1 discloses a sealing system which is used for sealing between a piston and a cylinder. This invention differs substantially from the present invention in that the pressure between the seals does not equal the pressure of the pump volume.

WO 86/03817 shows a piston and a device which may be used in pumps to supply liquid into the piston itself.

U.S. Pat. No. 2,615,769 shows a configuration of a pump piston with two piston rings and a pressurized liquid between them.

The publications EP 158457, FI 843735 and FI 65477 show different embodiments of pistons, in which liquid under pressure is used in order to seal between a piston and a cylinder wall.

The present invention differs from known technique in that the pressure between the first and the second piston seals approximately equals the pressure within the pump chamber at all times. According to the invention the first piston seal is thus always subjected to equal pressures on both sides.

BRIEF DESCRIPTION OF THE DRAWINGS

The invention will now be explained in further detail in connection with the description of an exemplary embodiment referring to accompanying drawings, in which.

DETAILED DESCRIPTION OF THE INVENTION

Figure 1:
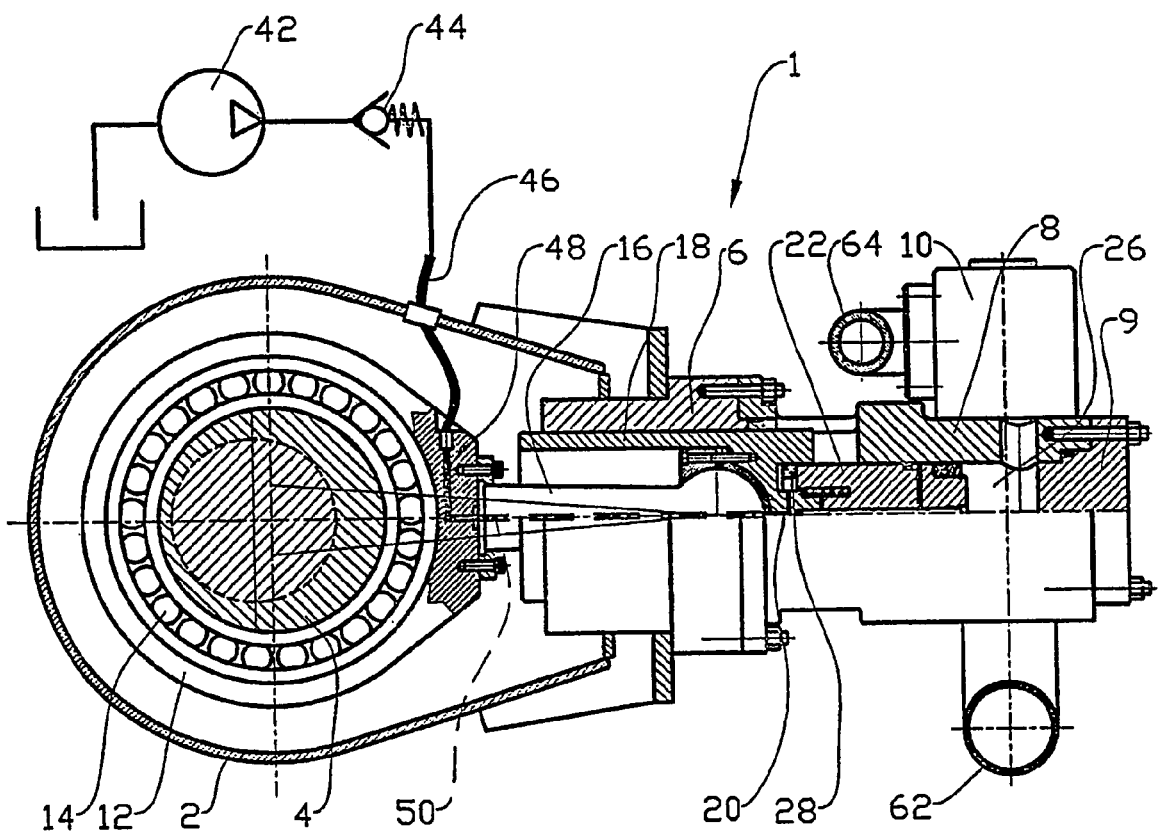
FIG. 1 shows a section through a reciprocating pump, in which compensating liquid is supplied through the piston rod.

In the drawings the reference numeral 1 identifies a reciprocating pump in an embodiment essentially known, comprising a crank case 2 with a rotating crank 4, a sliding guide housing 6, a cylinder 8 which is fixedly connected to the sliding guide housing 6 and has an end cap 9, and a valve housing 10 is fixedly connected in a sealing manner to the cylinder 8. A bearing housing 12 is rotatably connected by means of a roller bearing 14 to the eccentric portion of the crank 4. A piston rod 16 is fixedly connected at one end portion to the bearing housing 12, and is provided, at its opposite end portion, with a spherical bearing surface 20 bearing on a guide element 18.

Because of the eccentric position of the bearing 14 relative to the centre of the crank 4, a reciprocating motion is imparted to the guide element 18.

The valve housing 10 is provided with check valves, not shown, according to known technique.

Figure 2:
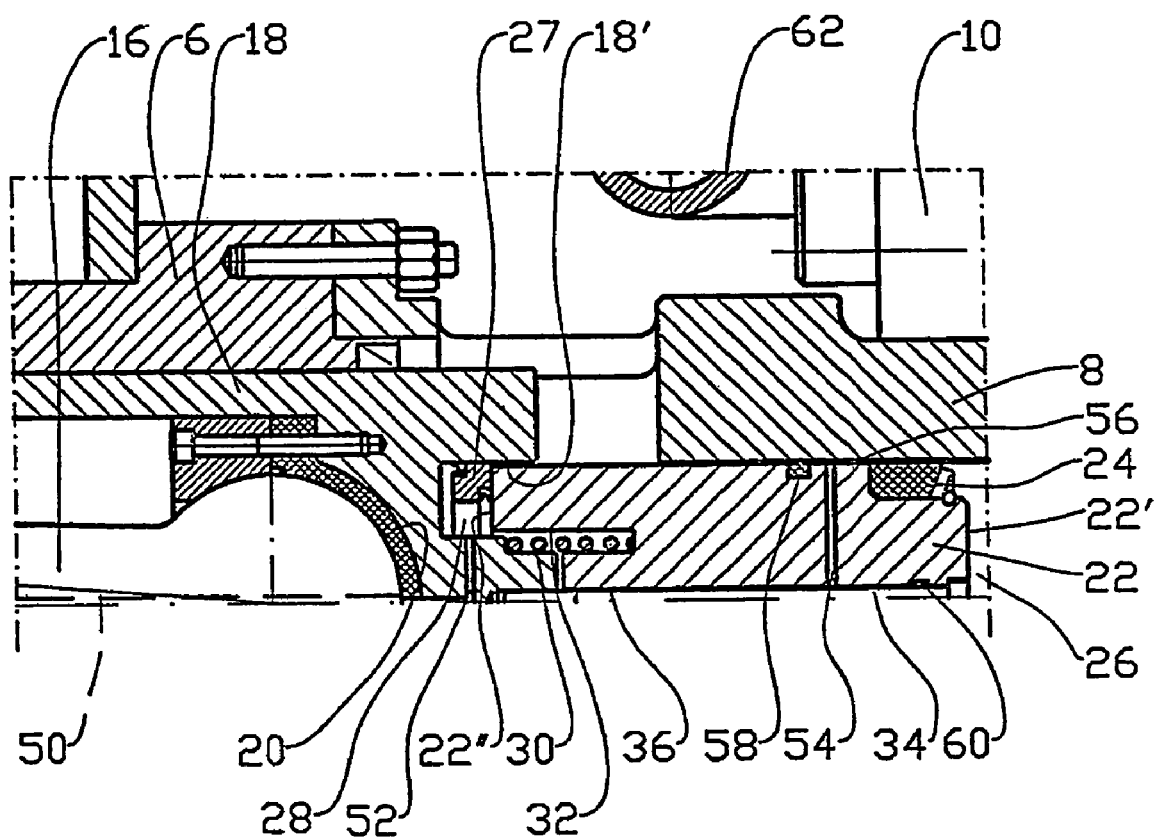
FIG. 2 shows, on a larger scale, a section of the pump of FIG. 1.

A piston 22, see FIG. 2, is disposed in a known manner in the cylinder 8 with its one end portion 22' sealing by means of a first piston seal 24, and is arranged to be reciprocated within a pump chamber 26.

Figure 3:
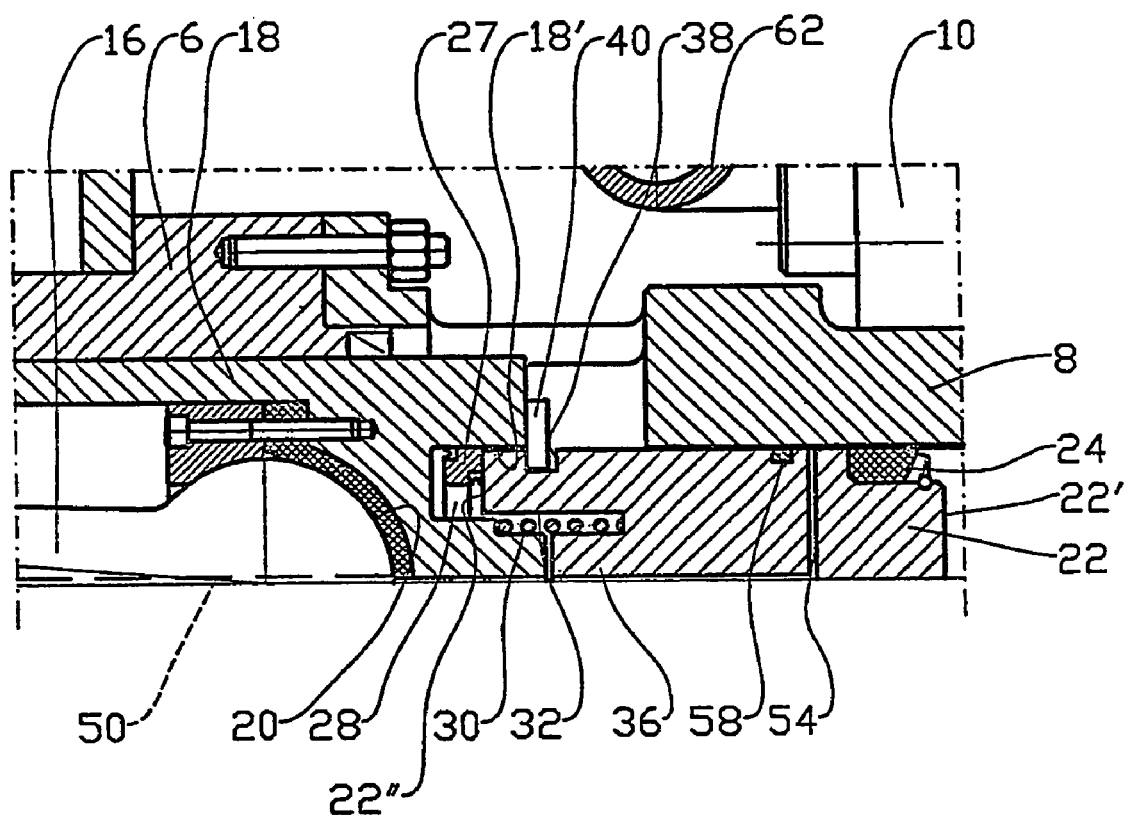
FIG. 3 shows the same as FIG. 2, but with an alternative piston stopping device.

According to the invention, by its opposite end portion 22", the piston 22 is positioned sealingly, by means of a seal 27, in a chamber 28 in the form of a cylindrical recess 18' in a guide element 18. A helical spring 30 extends in an annular groove 32 in the piston 22 between the piston 22 and the guide element 18. The helical spring 30 is arranged to displace the piston 22 in a direction away from the guide element 18 so that the camber 28 will be as large as possible. A stopper in the form of a bolt 34 threaded into the guide element 18, and extending sealingly through a bore 36 through the piston 22 as is shown in FIGS. 1 and 2, or in the form of a groove 38 disposed externally on the piston 22 and a preferably two-part locking plate 40, as is shown in FIG. 3, pre vent the piston 22 from being displaced out of the pressure chamber 28.

A feed pump 42 feeds the pressure chamber 28 through a check valve 44, a hose 46, a bore 48 of the bearing housing 12, a bore 50 of the piston rod 16 and a bore 52 of the guide element 18. A bore 54 connects the through bore 36 of the piston 22 with the external cylinder surface of the piston 22 and opens into an annular space 56 between the piston 22 and the cylinder 8 defined by the first piston seal 24 and a second piston seal 58. A seal 60 surrounds the bolt 34 and prevents liquid from flowing between the pump chamber 26 and the pressure chamber 28. Liquid present in the pressure chamber 28 communicates with the annular space 56 through the channels/bores 36 and 54.

When the feed pump 42 is started, the pressure chamber 28 is filled with clean liquid through the valve 44 and the hose/bores 46, 48, 50 and 52. The liquid pressure on the end surface of the piston 22 within the pressure chamber 28 and the compressive force from the spring 30 displace the piston 22 in a direction from the guide element 18, so that the piston 22 bears on the head of the bolt 34, alternatively on the locking plate 40. From the pressure chamber 28 liquid flows through the bores 36 and 54 to the annular space 56. The liquid pressure from the feed pump 42 is insignificant compared to the normal working pressure of the pump 1.

When the guide element 18 and thereby the piston 22 are displaced in a direction from the pump chamber 26 by means of the connecting rod 16, bearing housing 12 and bearing 14 due to the rotation of the crank 4, particle-containing liquid is drawn from the intake manifold 62 of the pump 1 through the valve housing 8 into the pump chamber 26.

When, during their pumping stroke, the guide means 18 and the piston 22 are next displaced in a direction towards the pump chamber 26, the particle-containing liquid present in the pump chamber 26 flows out through the valve housing 10 and further into the pressure manifold 64 of the pump 1. During the pumping stroke a force is exerted by the liquid present in the pump chamber 26 on that end surface of the piston 22 which is inside the pump chamber 26. This liquid pressure force displaces the piston in a direction towards the guide element 18, where the opposite end portion 22" of the piston 22 is positioned in the cylindrical recess 18'. The piston 22 has an equally large end area at either end portion 22' and 22" as the bolt 34 is cylindrical. The liquid pressure inside the chamber 28 is thus essentially identical with the pressure inside the pump chamber 26. An insignificant pressure difference between the two chambers 26 and 28 may occur due to the moment of mass inertia of the piston, the compressive force of the helical spring 30 and the pressure from the feed pump 42.

The check valve 44 prevents a flow of liquid from the chamber 28 to the feed pump 42. The liquid pressure inside the chamber 28 propagates through the bore 36 and 54 to the annular space 56. The first piston seal 24 is thereby subjected to essentially equal pressure from both sides. The second piston is seal 58 prevents liquid from exiting between the cylinder 8 and the piston 22.

The first piston seal 24 being pressure-sealing only to an insignificant degree, it is subjected to substantially less penetration of particle-containing liquid from the pressure chamber 26. The life of the first piston seal 24 is thus substantially extended.

Any leakage of clean liquid is replenished by the feed pump 42.

Figure 4:
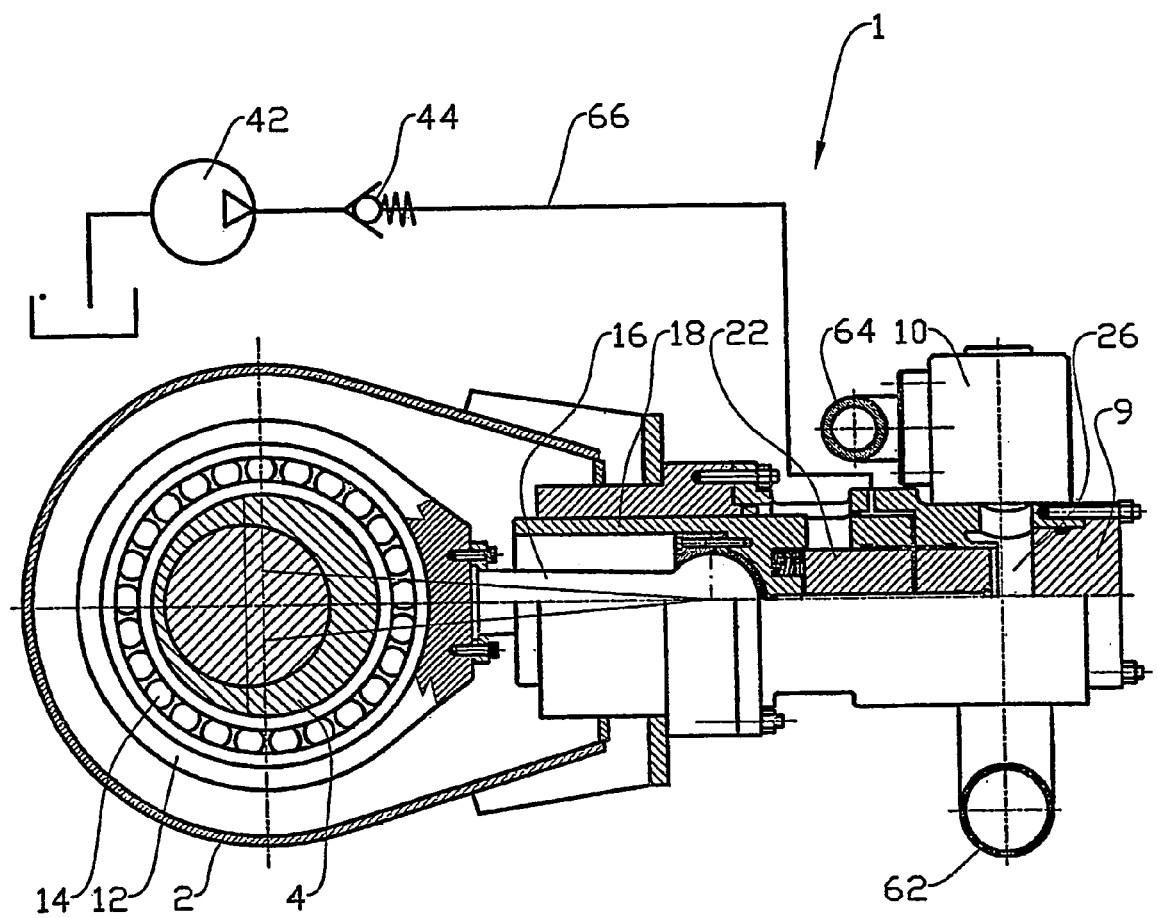
FIG. 4 shows a section through a second exemplary embodiment of a reciprocating pump, in which compensating liquid is supplied through the cylinder wall.
Figure 5:
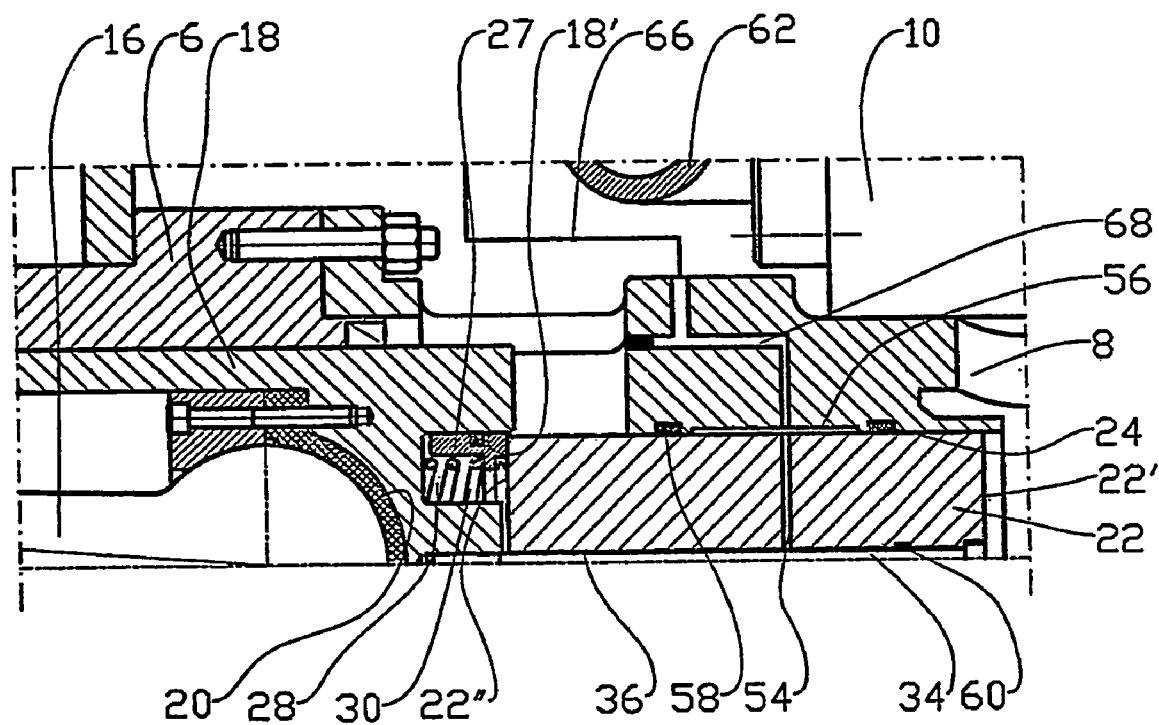
FIG. 5 shows, on a larger scale, a section of the pump of FIG. 4.

In an alternative embodiment, see FIGS. 4 and 5, the pressure chamber 28 is charged with clean liquid from the feed pump 42 through the check valve 44, a pipe 66, a channel 68 of the cylinder 8 opening into the annular space 56, the channel/bore 54 and the channel/bore 36. The helical spring 30 is positioned in the pressure chamber 28. The operation is identical to that which is described above.

What is claimed is:

1. A method of forming a sliding seal between a reciprocating piston (22) and the wall of a cylinder (8), wherein one side of the piston faces a first liquid in a pump chamber (26) of the cylinder (8), a first piston seal (24) and a second piston seal (58), spaced from the first piston seal (24), sealing between the piston (22) and the cylinder (8); and wherein a second liquid is supplied under pressure between the seals (24, 58), characterized in that the pressure of the second liquid between the seals (24, 58) is maintained at a level essentially equal to or slightly lower than the pressure of the pump chamber (26).

2. A device at a piston (22) of a reciprocating pump (1), wherein the piston (22) reciprocates and works against a first liquid within a pump chamber (26) in a cylinder (8), a first piston seal (24) forming a sliding seal between the piston (22) and the cylinder (8), thereby sealing against the pump chamber (26), and a second piston seal (58) spaced from the first piston seal (26) forming a sliding seal between the piston (22) and the cylinder (8) and sealing towards the surroundings, and wherein the piston (22) is displaceable relative to a driving guide element (18) and influences a second liquid in a pressure chamber (28) defined by the piston (22) and the guide element (18), a seal (27) being arranged between the piston (22) and the guide element (18), and the pressure chamber (28) being able to communicate with an area between the first and second piston seals (24, 58) through openings/channels (36, 54) in the piston (22), and a spring (30) being arranged to keep the piston (22) and the guide element (18) in relative positions that will give the chamber (28) its largest volume when the piston is otherwise idle, and wherein the total end surface area of the piston (22) within the pump chamber (26) is approximately just as large as the total end surface area of the piston (22) located within the chamber (28), so that the pressure between the first and second piston seals (24, 58) approximately equals the pressure within the pump chamber (26) at all times.

3. A device in accordance with claim 2, characterized in that the piston (22) is provided with an axial through central bore (36) enclosing a central bolt (34) secured to the guide element (18), a seal (60) being arranged between the bolt (34) and the central bore (36) of the piston (22) to separate the first and the second liquid.

4. A device in accordance with claim 2, characterized in that the guide element (18) is provided with a locking plate (40) projecting into a groove (38) completely or partially surrounding the piston (22).

5. A device according to claim 2, characterized in that a feed pump (42) is connected to the pressure chamber (28) through a check valve (44).

6. A device according to claim 5, characterized in that the pressure chamber (28) is communicatingly connected to the pump/check valve (42, 44) through a hose (46), a channel (48) of the bearing housing (12) of the reciprocating pump (1), a channel (50) in the piston rod (16) of the reciprocating pump (1) and a channel (52) of the guide element (18).

7. A device according to claim 5, characterized in that the pressure chamber (28) is communicatingly connected to the pump/check valve (42, 44) through a pipe (66), a channel (68) of the cylinder (8), the area between the first and second piston seals (24, 58), and the openings/channels (36, 54).

* * * * *